United States Patent

Rezzouk et al.

Patent Number: 5,809,169
Date of Patent: Sep. 15, 1998

[54] METHOD OF EXTRACTING CONTOURS USING MULTIFRACTAL ANALYSIS

[75] Inventors: Jamal Rezzouk, Orsay; Frédéric Renouard, Paris, both of France

[73] Assignee: Alcatel Alsthom Compagnie Generale d'Electricite, Paris, France

[21] Appl. No.: 616,344

[22] Filed: Mar. 15, 1996

[30] Foreign Application Priority Data

Mar. 17, 1995 [FR] France ................... 95 03142

[51] Int. Cl.$^6$ ................................................ G06K 9/48
[52] U.S. Cl. ........................................ 382/199; 382/249
[58] Field of Search ................... 382/199, 249, 382/108, 202, 204

[56] References Cited

FOREIGN PATENT DOCUMENTS 43 17746 A1  12/1994  Germany.
WO 90/10278  9/1990  WIPO.

OTHER PUBLICATIONS

Amir et al. "Using Dynamic Programming for Minimizing the Energy of Active Contour in the Presence of Hard Constraints" 1988 IEEE.

Cheong, C.K. et al, "Structural Edge Detection Based on Fractal Analysis for Image Compression", *IEEE Int* vol. 5, 10 May 1992, San Diego, CA, USA, pp. 2461–2464.

Bourissou A. eet al, "A Multifractal Approach for Terrain Characterization and Classification on SAR Images", *IGARSS '94: International Geoscience and Remote Sensing Symposium. Surface and Atmospheric Remote Sensing: Technologies, Data Analysis and Intnterpretation*, vol. III, 8 Aug. 1994, Pasadena, CA pp. 1609–1611.

*Primary Examiner*—Phuoc Tran
*Attorney, Agent, or Firm*—Sughrue, Mion, Zinn, Macpeak & Seas, PLLC

[57] ABSTRACT

A method of extracting a contour of a contrasted area in a digitized image made up of pixels having different intensity levels defining the contrasted area is based on minimizing the energy of an initial active contour to which are applied stresses derived from a potential image obtained by processing the image. The potential image is obtained from a multifractal analysis of the image so that each element of the potential image is representative of a local fractal dimension in the locality of a corresponding pixel in the image. This improves the behavior of the active contour when it is deformed by the stresses.

5 Claims, 3 Drawing Sheets

METHOD OF EXTRACTING CONTOURS USING MULTIFRACTAL ANALYSIS

BACKGROUND OF THE INVENTION

1. Field of the Invention

The invention concerns a method of extracting a contour of a contrasted area in a digitized image, in particular a digitized photographic image.

The invention applies in particular to interactive systems assisting extraction and identification of site infrastructures in interpreting aerial and satellite photographic images. In particular, the invention applies to the extraction and identification of road networks in photographic images for making themed maps or for planning mobile radio networks.

The expression "digitized image" is used to describe an image made up of pixels having different intensity levels in accordance with a given scale of intensity levels and which define contrasted areas. The scale of interest can be a scale of gray levels.

2. Description of the Prior Art

The article "Using Dynamic Programming for Minimizing the Energy of Active Contours in the Presence of Hard Constraints" by Amir A. Amini et al, IEEE, Second Int. Conference on Computer Vision, 5 Dec. 1988, TAMPA (Fla.), pages 95–99 describes a method of extracting contours based on minimizing the energy of an initial active contour. The article "Towards Dynamic Adaptation of snakes contours", International Conference Image Analysis and Processing, by Marie-Odile Berger, Como (Italy), September 1991 also refers to this method of extracting contours.

Using this method, an active contour initially placed near a contrasted area in the digitized image is deformed by stressing it until it stabilizes in a position that normally defines the contour of the contrasted area, the stable position of the initial contour corresponding to a minimum energy of the latter.

The stresses are derived from a potential image obtained by processing the digitized image. In the article by Marie-Odile Berger mentioned above, the potential image is obtained by transforming the intensity image using a gradient operator. The pixels of the image placed on the contour of a contrasted area appear as local potential minima in the potential image and minimizing the energy of the active contour is an iterative process that pushes the contour towards the local potential minima.

The intensity gradient operator is an operator that translates a variation of intensity in the locality of a pixel of the image. There are various method of calculating the intensity gradient, for example the Roberts method described in "Digital Image Processing" by William K. Pratt (page 498) or the Prewitt and Sobel method described in the same work (page 503).

The drawback of the intensity gradient operator is that it translates uniformly all the variations of intensity in the image into local potential minima, whether such variations are localized, follow regular lines such as the contours of site infrastructures or follow irregular lines due to variations of texture in the image. Such variations of texture occur frequently if the image includes wooded areas, shaded areas or the like.

If the method of minimizing the energy of an initial active contour is used to extract site infrastructure contours in an image including areas of variation of texture as mentioned above, it is found that the initial active contour is pushed just as much towards the local potential minima due to the contours of such infrastructures as towards the local potential minima due to the variations of texture. As a result the deformation behavior of the active contour is strongly disturbed.

An object of the invention is to propose a solution that eliminates or at least reduces unwanted local minima in the potential image, in particular local minima due to variations of texture, in the case of extracting site infrastructure contours, for example.

Another object of the invention is to propose a solution for easy extraction of contours of contrasted areas defined beforehand in accordance with a criterion of singularity such as regularity, by the method of minimizing the energy of an initial active contour.

SUMMARY OF THE INVENTION

To this end, the invention consists in a method of extracting a contour of a contrasted area in a digitized image made up of pixels having different intensity levels defining the contrasted area, the method being based on minimizing the energy of an initial active contour to which are applied stresses derived from a potential image obtained by processing the image, wherein the potential image is obtained from a multifractal analysis of the image so that each element of the potential image is representative of a local fractal dimension in the locality of a corresponding pixel in the image.

Multifractal analysis is a technique for analyzing the behavior of a measurement when the scale of resolution is varied. Multifractal measurements describe each pixel of an image in terms of singularity type, singularity intensity and singularity density. In other words, a rare singularity is representative of a line or contour in the image whereas a dense singularity is representative of a strongly textured area in the image. A singularity can be characterized in particular by a regularity. By choosing the multifractal measurement appropriately, it is possible to discriminate regular contours corresponding to site infrastructures, for example, and irregular contours corresponding to natural areas such as wooded hills, according to the values of the fractal dimension.

In one embodiment of the invention, said local fractal dimension is an estimate of the Hölder coefficient calculated from a multifractal measurement based on counting pixels in different localities centered on the pixel of interest having an intensity near that of the pixel of interest. This measurement readily shows up fine lines in the image corresponding to perimeters of site infrastructures such as buildings, for example.

In another embodiment of the invention, the local fractal dimension is an estimate of the Hölder coefficient calculated from a multifractal measurement based on counting pixels in different localities centered on the pixel of interest having an intensity near that of the pixel of interest and contiguous with the latter. This measurement is particularly suitable for extracting and identifying roads, especially when they comprise two separate parallel carriageways.

Other features and advantages of the invention will emerge more clearly from the following description of one embodiment of the invention.

DETAILED DESCRIPTION OF THE PREFERRED EMBODIMENT

The method in accordance with the invention of extracting contours is based on minimizing the energy of an initial active contour that is stressed. This method requires the construction of a potential image from which the stresses are derived. The potential image is obtained by processing a digitized image including a contrasted area, having a contour to be extracted. In the present example the image includes pixels having different gray levels. This image is referred to hereinafter as an intensity image.

Figure 2:
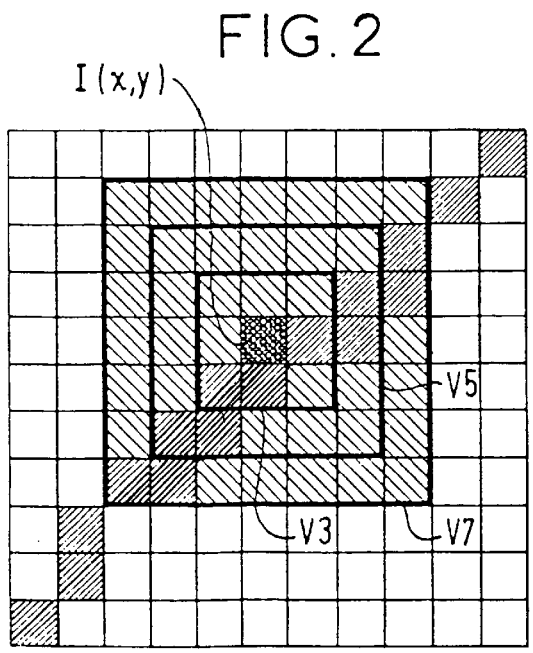
FIG. 2 shows a first intensity image from which local fractal dimensions are calculated.

FIG. 2 shows an intensity image in which the pixels are represented by squares. In this example the image is very small. Each pixel has a particular intensity level. By convention, the white squares have an intensity level of 0, the light gray squares have an intensity level of 1 and the dark gray and black squares have an intensity level of 2. The number of intensity levels has been made very small to simplify the description of the method of the invention.

The invention uses multifractal analysis to process the intensity image to obtain the potential image. In particular, each element of the potential image is representative of a local fractal dimension in the locality of a pixel in the intensity image. The invention uses the Hölder exponent to estimate the fractal dimension. This exponent expresses the manner in which a measurement varies when the size of the locality to which it is applied varies.

Figure 1:
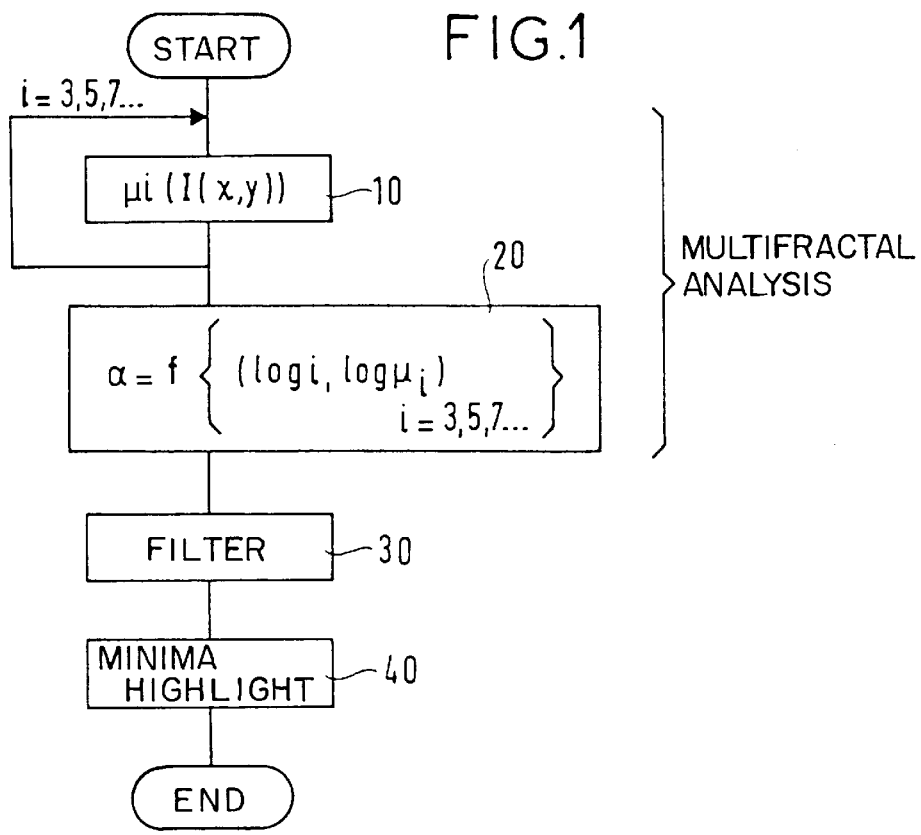
FIG. 1 relates to the method of calculating a local fractal dimension.

The invention calculates the Hölder exponent for a pixel of the intensity image in the manner shown in FIG. 1.

The pixel has an intensity level defined by $I(x,y)$ where x and y denote the coordinates of the pixel in the intensity image. The values of a multifractal measurement $\mu$ are calculated (10) for successive localities Vi of the pixel $I(x,y)$ centered on that pixel. The localities Vi shown in FIG. 2 (V3, V5, V7) are windows of different sizes i where i represents the dimension of one side of the window expressed as a number of pixels. The side of each window necessarily includes an odd number i of pixels. The number of values of the measurement to be calculated for each pixel is a parameter defined beforehand.

Figure 3:
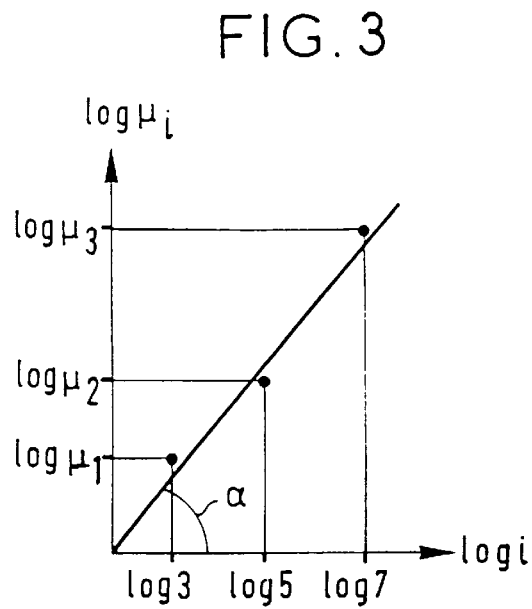
FIG. 3 also relates to the method of calculating a fractal dimension.

In the FIG. 1 example, three values $\mu_3$, $\mu_5$, $\mu_7$, of the multifractal measurement are calculated for three localities of the pixel $I(x,y)$. The value of the Hölder exponent $\alpha(I(x,y))$ is then calculated (20) by a function f for estimating the slope of the linear regression of the points with coordinates (log 3, log $\mu_3$), (log 5, log $\mu_5$), (log 7, log $\mu_7$). The slope $\alpha$ of the linear regression is shown in FIG. 3 and corresponds to the fractal dimension calculated for the pixel $I(x,y)$ of the image.

The calculation explained above is repeated for each pixel I of the intensity image to obtain an image of local fractal dimensions corresponding to the intensity image.

The invention uses as the multifractal measurement a measurement $\mu$iso having a value, for a given locality centered on a pixel of interest, that is equal to the number of pixels in this locality having intensity levels near (to within an error $\xi$) the intensity level of the pixel of interest.

This measurement is suitable for extracting regular contours such as the contours of site infrastructures such as buildings.

Figure 4:
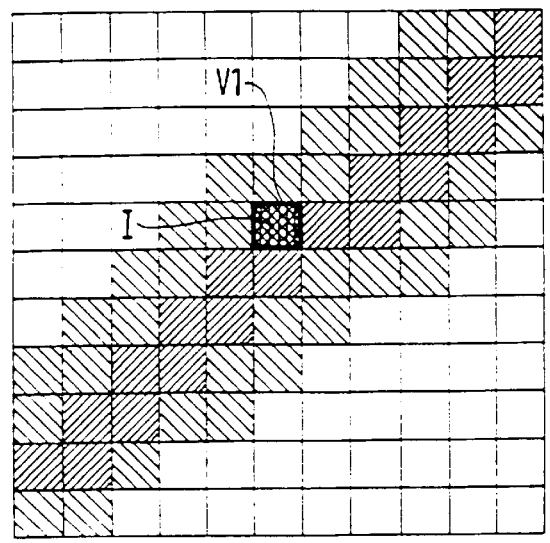
FIGS. 4 through 6 show a second intensity image from which a local fractal dimension of a pixel is calculated from a first multifractal measurement.

FIG. 4 shows another example of intensity image. The value of the measurement $\mu$iso for a locality V1 of size 1 in the intensity image and centered on the pixel I is equal to 1 (the error value $\xi$ is set at less than 1 in this case).

Figure 5:
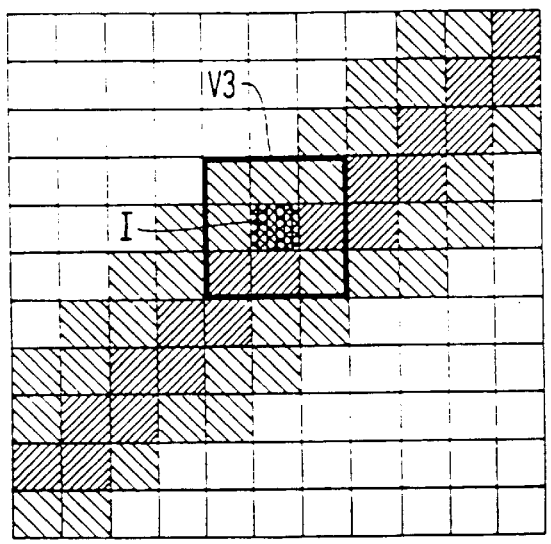

In FIG. 5, the value of the measurement $\mu$iso for a locality V3 of size 3 in the intensity image centered on the pixel I is equal to 4.

Figure 6:
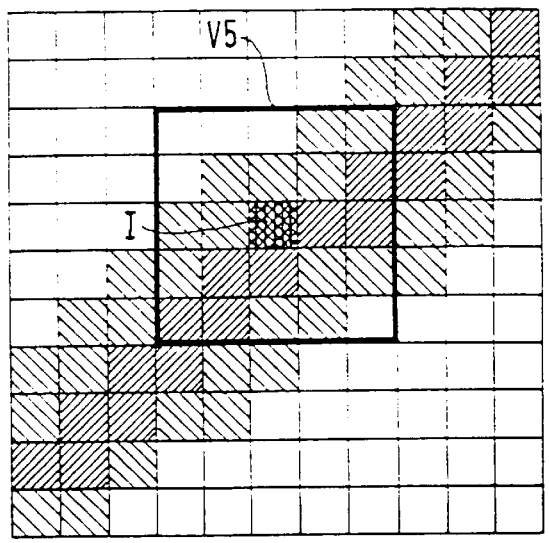

In FIG. 6, the value of the measurement $\mu$iso for a locality V5 of size 5 centered on the same pixel I is equal to 8. After step 10 in FIG. 1 the following pairs of values are obtained: (1, 1), (3, 4), (5, 8). The fractal dimension calculated for the pixel I corresponds to the slope of the linear regression straight line passing through the points with coordinates (log 1, log 1), (log 3, log 4), (log 5, log 8), i.e. the points with coordinates (0, 0), (1.0986, 1.3862), (1.6094, 2.0794).

Figure 7:
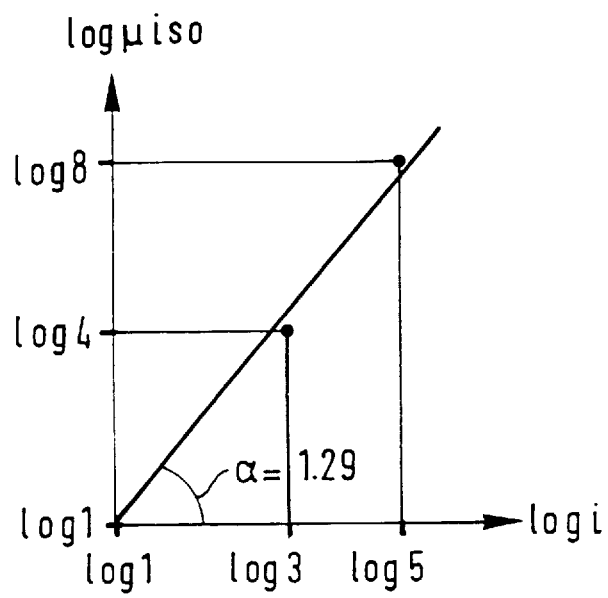
FIG. 7 shows the calculation of the local fractal dimension for a pixel of the image shown in FIGS. 4 through 6.

In FIG. 7, the slope $\alpha$ of the regression straight line is estimated at 1.29. Note that for this measurement $\mu$iso, a value of $\alpha$ close to 1.0 for a given pixel indicates that the pixel is on a regular line of a contour whereas a value close to 1.3 indicates that the pixel is on an irregular line of a contour.

The local fractal dimensions obtained after step 20 in FIG. 1 are filtered in step 30 to retain only those between two previously selected thresholds, for example those with a value close to 1.0 and which correspond to regular contours to obtain a filtered image cleared of pixels that could disturb the behavior of the active contour.

The threshold values must be determined experimentally according to the type of contour to be extracted. The method of threshold determination using hysteresis described above produces a filtered image in which the elements have a binary value, for example the value 0 if the local fractal dimension for the element is outside the two thresholds and the value 1 if it is between the two thresholds. The filtered image is then processed in step 40 to highlight the potential minima using a distance operator to assign to each point of the filtered image a value representing its distance from the nearest point having a non-zero binary value. The potential image is obtained after this processing (40).

The sizes of the smallest locality and the largest locality defined in step 10 in FIG. 1 can be adjusted to suit the width of the contrasted area to be circumscribed in order to optimize the calculation of the fractal dimensions. Thus the size of the smallest locality can advantageously be equal to the width of this area and the size of the largest locality can advantageously be equal to twice the width of this area. To optimize the calculation of the local fractal dimensions the number of localities must be as small as possible.

As an alternative to the above, the multifractal measurement used is a measurement $\mu$cont, the value of which for a given locality centered on a pixel of interest is equal to the number of pixels in that locality having intensity levels near (to within an error $\xi$) the intensity level of the pixel of interest, these pixels being additionally contiguous with the pixel of interest.

This measurement is suitable for extracting regular contours in the form of parallel lines, such as roads.

Figure 8:
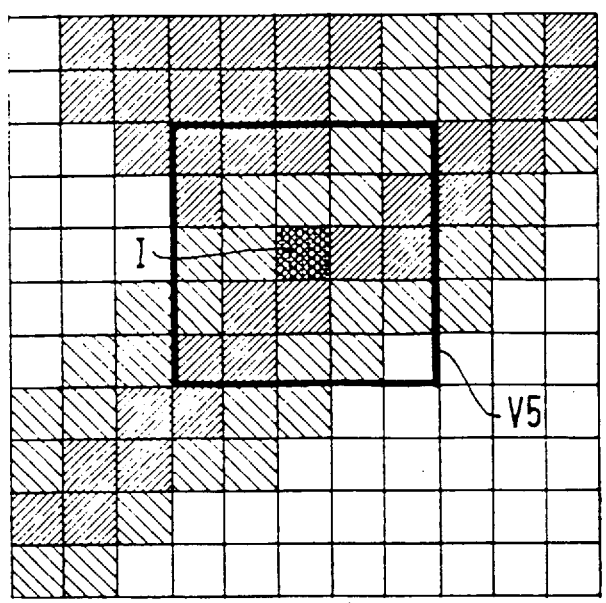
FIG. 8 shows a third intensity image from which a local fractal dimension of a pixel is calculated from a second multifractal measurement.

For example, the value of the measurement $\mu$cont for a locality of size 5 in FIG. 8 is equal to 8 while the value of the measurement $\mu$iso for the same locality is equal to 12.

The method of the invention for extracting contours thus has the advantage of being adjustable to suit a previously predetermined type of singularity by changing the multifractal measurement used to obtain the potential image.

There is claimed:

1. Method of extracting a contour of a contrasted area in a digitized image made up of pixels having different intensity levels defining said contrasted area, said method being based on minimizing the energy of an initial active contour to which are applied stresses derived from a potential image obtained by processing said image, wherein said potential image is obtained from a multifractal analysis of said image so that each element of said potential image is representative of a local fractal dimension in the locality of a corresponding pixel in said image.

2. Method according to claim 1 wherein said local fractal dimension is an estimate of the Hölder coefficient calculated from a multifractal measurement based on counting pixels in different localities centered on the pixel of interest having an intensity near that of said pixel of interest.

3. Method according to claim 1 wherein said local fractal dimension is an estimate of the Hölder coefficient calculated from a multifractal measurement based on counting pixels in different localities centered on the pixel of interest having an intensity near that of said pixel of interest and contiguous with the latter.

4. Method according to claim 2 including a step of hysteresis thresholding of said local fractal dimensions to obtain said potential image.

5. Method according to claim 3 including a step of hysteresis thresholding of said local fractal dimensions to obtain said potential image.

* * * * *